United States Patent Office 2,857,304
Patented Oct. 21, 1958

2,857,304

DITHIODIMETHYLENE DIPHOSPHONATES

Gail H. Birum, Dayton, Ohio, assignor to Monsanto Chemical Company, St. Louis, Mo., a corporation of Delaware No Drawing. Application November 23, 1954
Serial No. 470,788

19 Claims. (Cl. 167—22)

This invention relates to new sulfur-containing organic compounds of phosphorus, to methods of preparing the same, and to pesticidal compositions comprising said compounds.

The new phosphorus compounds which we have found to possess high efficiency when employed as insecticides and pesticides in general have the formula $$\begin{array}{c} X-R \\ | \\ R-X-P-CH_2SSCH_2-P-X-R \\ \| \quad\quad\quad\quad\quad\quad\quad\quad \| \\ X \quad\quad\quad\quad\quad\quad\quad\quad X \end{array}\begin{array}{c}X-R\\|\\ \\ \end{array}$$

in which R is an organic radical of from 1 to 18 carbon atoms and selected from the class consisting of hydrocarbon radicals and hydrocarbon radicals containing a substituent of the class consisting of halogen, nitro and alkoxy radicals, and X is selected from the class consisting of oxygen and sulfur.

Compounds having the above formula and provided by the present invention are readily prepared by condensing a completely esterified trivalent phosphorus acid or an alkali metal diester of said acid with a bis(halomethyl) disulfide substantially according to the scheme

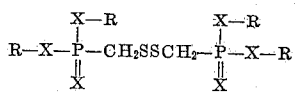
+ HalCH₂SSCH₂Hal ⟶

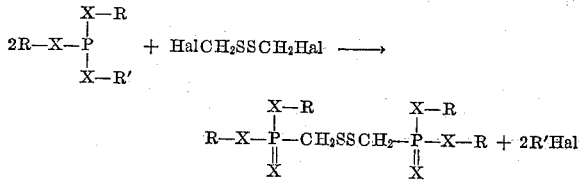

in which R' is selected from the class consisting of the R defined above and alkali metal, and Hal denotes halogen.

As herein stated, X in the above formula may be oxygen or sulfur. When it is always oxygen, the present products are esters of (dithiodimethylene)diphosphonic acid and have the formula

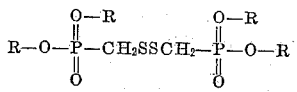

in which R is as herein defined. Such products are obtained by condensation of the bis(halomethyl) disulfide with a triester of phosphorous acid or with an alkali metal diester of phosphorous acid.

One class of trivalent phosphorus esters which is useful for the present purpose comprises the triesters of phosphorous acid and a monohydroxylated hydrocarbon, i. e., esters of the formula P—(OY)₃ in which Y is a hydrocarbon radical of from 1 to 18 carbon atoms. As examples of such triesters may be mentioned the trialkyl esters such as trimethyl, triethyl, tri-n-propyl, triisoamyl, trihexyl, tris(2-ethylhexyl), trinonyl, tri-tert-dodecyl, tris(2-butyloctyl), tritridecyl, trihexadecyl, trioctadecyl, diethyl propyl, amyl dimethyl, dibutyl dodecyl, diheptyl octadecyl or butyl ethyl propyl phosphite; the tricycloalkyl or mixed cycloalkyl phosphites such as tricyclohexyl, the phenyl dicyclopentyl, the di-n-butyl 4-methylcyclohexyl or the cyclopropyl dibenzyl phosphite; the triaryl or the mixed alkyl aryl triesters such as the triphenyl, tribiphenylyl, tri-1-naphthyl, n-butyl diphenyl or didodecyl phenyl phosphite; the tris(alkaryl) or the mixed alkaryl esters such as the tri-2-tolyl, tris (2-ethylphenyl), tris(4-dodecylphenyl), tricymyl, tris(1-isopropyl-2-naphthyl), tris(4-amyl-4-biphenylyl), amyl bis(2,4-dimethylphenyl), phenyl di-4-tolyl, or bis(4-isopropylphenyl) ethyl phosphite; the tris(aralkyl) or the mixed aralkyl esters such as tribenzyl, tris(2-phenylethyl), tris(4-tert-butylbenzyl), tris(1-naphthylmethyl), dibenzyl phenyl, amyl dibenzyl, bis(3-phenylpropyl) 4-tolyl, or tris(4-dodecylbenzyl) phosphite; the tris(alkenyl) esters or the mixed alkenyl esters such as the triisopropenyl, triallyl, tri-1-dodecenyl, tri-2-pentenyl, tri-1-octadecenyl, allyl diphenyl, diallyl ethyl, benzyl diisopropenyl or bis(4-nonylbenzyl) 2-butenyl phosphite; the tris(alkynyl) esters or the mixed alkynyl esters such as tripropargyl or diethyl propargyl phosphite, etc. Especially valuable are esters of phosphorous acid and mixtures of higher alcohols obtained according to the "Oxo" process by carbonylation and hydrogenation of an olefin, e. g., the tridecanol obtained from triisobutylene or tetrapropylene. Esters of phosphorous acid and such commercially available branched-chain alcohols as 2-n-propylheptanol, 2,6,8-trimethylnonanol-4, or 5-ethylnonanol-2 are valuable.

Instead of employing the hydrocarbon triesters in the condensation with the bis(halomethyl) disulfides there may be employed the alkali metal diesters, i. e., compounds of the formula Me—O—P—(OY)₂ in which Y is as above defined and M denotes alkali metal, i. e., potassium, sodium or lithium. Examples of such useful diesters are sodium di-n-butyl phosphite, sodium didodecyl phosphite, sodium diethyl phosphite, potassium dibenzyl phosphite, sodium di-4-tolyl phosphite, lithium di-2-naphthyl phosphite, potassium amyl tridecyl phosphite, potassium bis(2-phenylethyl) phosphite, sodium diallyl phosphite, potassium dipropargyl phosphite, etc.

Irrespective of whether the triester P(OY)₃ or the alkali metal diester MeO—P(OY)₂ is employed in the condensation reaction, the products are (dithiodimethylene)-diphosphonates of the formula

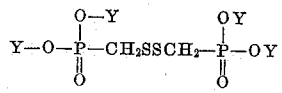

in which Y is a hydrocarbon radical of from 1 to 18 carbon atoms. Depending upon whether a mixed phosphite or a simple phosphite is employed, Y in the above formula may be same or dissimilar. Thus the product obtained from one mole of the bis(halomethyl) disulfide and two moles of a simple triester or alkali metal diester such as triethyl phosphite or sodium diethyl phosphite is the tetraethyl (dithiodimethylene)diphosphonate of the structure

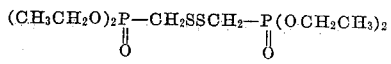

whereas the product obtained from one mole of the disulfide and two moles of an alkali metal mixed diester such as sodium ethyl methyl phosphite is the diethyl dimethyl (dithiodimethylene)diphosphonate of the formula

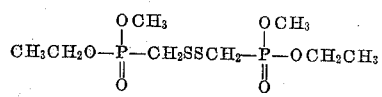

Mixed esters are also obtainable by condensing one mole of the disulfide with one mole of a phosphite to obtain a monophosphonate, and then reacting the monophosphonate with a mole of a dissimilar phosphite thus:

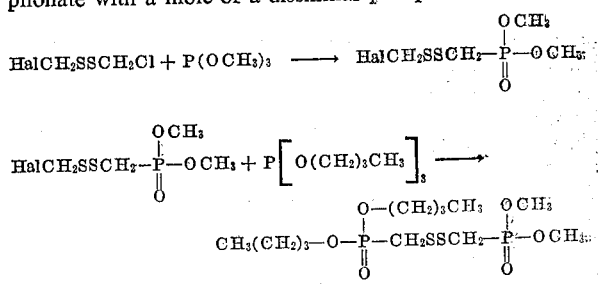

As will be apparent to those skilled in the art, a mixed phosphite may be used instead of the simple phosphite in either step. Thus bis(chloromethyl) disulfide is reacted first with one mole of an alkali metal phosphite such as potassium methyl phenyl phosphite to give the methyl phenyl ester of the monophosphonic acid

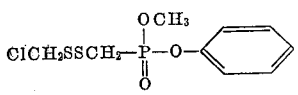

and this monophosphonate is then reacted with one mole of a mixed alkali metal phosphite such as potassium benzyl 4-ethylphenyl phosphite to give the diphosphonate

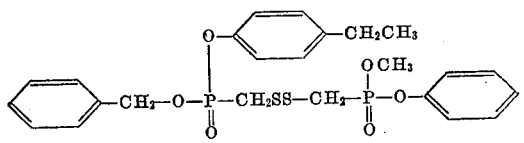

Either the mixed or the simple diphosphonates may have as substituents in the alcohol or phenol portion of the molecule at least one of the substituents: halogen, nitro or alkoxy, the presence of such substituents in the phosphite reactant having substantially no effect on the ease of reactivity thereof with the bis(halomethyl) disulfide. Thus the following substituted triesters or alkali metal diesters may be condensed with said disulfide: the halogen substituted esters such as tris(2-chloroethyl) phosphite, potassium bis(2,4-dichlorophenyl) phosphite or sodium bis(pentachlorophenyl) phosphite; the nitro-substituted phosphites such as tris(2-nitropropyl) phosphite, sodium bis(4-nitrobiphenylyl) phosphite or potassium bis(4-nitrocyclohexyl) phosphite; the alkoxy-substituted phosphites such as tris(3-methoxypropyl) phosphite, potassium bis(2-methoxyphenyl) phosphite or sodium bis-(4-methoxybiphenylyl) phosphite, etc.

Examples of (dithiodimethylene)diphosphonates provided by the present invention by condensation of a disulfide such as bis(chloromethyl) disulfide, bis(bromomethyl) disulfide or bis(iodomethyl) disulfide with a simple or mixed phosphite are the following:

Tetra-n-amyl (dithiodimethylene)diphosphonate
Tetrakis(2 - butyloctyl)(dithiodimethylene)diphosphonate
Diethyl di - n - octadecyl (dithiodimethylene)diphosphonate
Methyl triphenyl (dithiodimethylene)diphosphonate
Tetrabenzyl (dithiodimethylene)diphosphonate
Tetrakis(2 - phenylethyl) (dithiodimethylene)diphosphonate
Dibenzyl di - 4 - tolyl (dithiodimethylene)diphosphonate
Didodecyl bis (4 - amylbenzyl) (dithiodimethylene)diphosphonate
Tetrakis(4 - chlorophenyl) (dithiodimethylene)diphosphonate
Tetrakis(3 - chloro - 4 - nitrophenyl) (dithiodimethylene)diphosphonate
Tetrakis(3 - ethoxypropyl) (dithiodimethylene)diphosphonate
Tetracyclohexyl (dithiodimethylene)diphosphonate
Tetrakis(4 - methylcyclopentyl) (dithiodimethylene)diphosphonate
Tetrapropargyl (dithiodimethylene)diphosphonate
Diallyl diphenyl (dithiodimethylene)diphosphonate
Allyl triethyl (dithiodimethylene)diphosphonate
Tetrakis(2,3 - dimethylphenyl) (dithiodimethylene)diphosphonate
Tetrakis(2 - methoxy - 1 - naphthyl) (dithiodimethylene)diphosphonate
Tetraphenyl (dithiodimethylene)diphosphonate
Diethyl diphenyl (dithiodimethylene)diphosphonate
Tetrakis(4 - iodophenyl) (dithiodimethylene)diphosphonate
Tetra - 4 - biphenylyl (dithiodimethylene)diphosphonate
Di - n - dodecyl diethyl (dithiodimethylene)diphosphonate
Tetrakis(3,4 - dichlorobenzyl) (dithiodimethylene)diphosphonate
Bis(2 - bromoethyl) di - n - butyl (dithiodimethylene)-diphosphonate
Tetradodec - 1 - enyl (dithiodimethylene)diphosphonate
Amyl butyl ethyl methyl (dithiodimethylene)diphosphonate
Tetraterpinyl (dithiodimethylene)diphosphonate
Bis(3 - nitrobenzyl) bis(4 - chlorobenzyl) (dithiodimethylene)diphosphonate
Tetrakis(4 - tert - butyl - 2 - chlorophenyl) (dithiodimethylene)diphosphonate
Tetracarvacryl (dithiodimethylene)diphosphonate
Tetrakis(2 - bromoallyl) (dithiodimethylene)diphosphonate
Tetrakis (2 - n - propylheptyl) (dithiodimethylene)diphosphonate The above (dithiodimethylene)diphosphonates are prepared by condensing the appropriate phosphite with the bis(halomethyl) disulfide. When, in place of a phosphite, there is employed an ester in which one or more of the phosphorus —O— atoms are replaced by sulfur, the products are thio-analogues of the phosphonates. Thus, instead of the phosphites, there may be employed esters of phosphorothious acid, i. e., of the formula

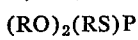

e. g., the triethyl ester of the O,O-diamyl S-ethyl ester or the sodium O,O-dimethyl ester. There may also be used esters of phosphorodithious acid, i. e., of the formula (RO)(RS)₂P, e. g., the tri-dodecyl ester, or the O-phenyl S,S-dimethyl ester or the sodium S,S-di-n-butyl ester. The esters of phosphorotrithious acid, i. e., (RS)₃P, or the alkali metal diesters thereof, e. g., the sodium dimethyl ester, the potassium di-p-tolyl ester or the sodium diallyl ester are likewise useful.

For obtaining good yields of the (dithiodimethylene)-bis-phosphonothioates the alkali metal diesters rather than the triesters of phosphorotrithious acid are advantageously employed. Depending upon the nature of the sulfur-containing ester which is used with the bis(halomethyl) disulfide the products are (dithiodimethylene)diphosphonothiolates of the formula

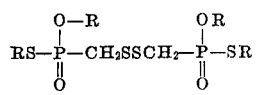

or (dithiodimethylene)diphosphonothionates of the formula

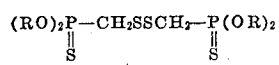

or (dithiodimethylene)bis(phosphonodithiolates) of the formula

or (dithiodimethylene)diphosphonothiolothionates of the formula

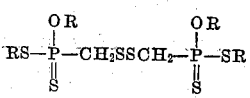

or (dithiodimethylene)bis(phosphonotrithioates) of the formula

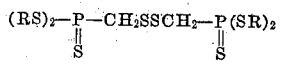

As in the case of the phosphites, mixed sulfur-containing phosphonates are obtainable by condensing one mole of the bis(halomethyl) disulfide with one mole of a trivalent thiophosphorus ester, and then condensing the mono-phosphono compound thus obtained with another trivalent phosphorus ester. Also, for the preparation of either the simple or the mixed phosphonothio esters, the alkali metal diesters of the thiophosphorous acids are advantageously employed. Thus, the bis(halomethyl)disulfide condenses with 2 moles of a sulfur-containing trivalent phosphorus ester such as O-sodium dimethyl phosphorodithioate to give tetramethyl (dithiodimethylene)-bis(phosphonodithiolate):

HalCH₂SSCH₂Hal + 2(NaO)(CH₃S)₂P ——>

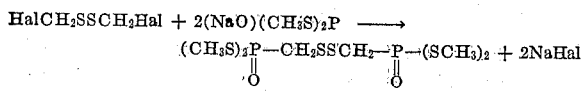

However, with only one mole of the O-sodium dimethyl phosphorodithioate the product is the monophosphonodithiolate of the structure

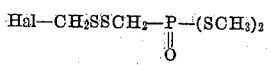

This may then be condensed with an entirely different trivalent phosphorus ester to give a mixed ester, e. g., with triethyl phosphite to give a tetra ester of the structure

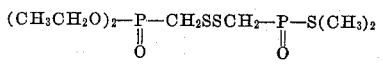

Examples of other phosphonothio compounds provided by the invention are:

Tetramethyl (dithiodimethylene)bis(phosphonodithiolate)
Tetrakis(2 - chloroethyl) (dithiodimethylene)diphosphonothiolate
Tetrakis(2 - nitrophenyl) (dithiodimethylene)diphosphonothiolate
Tetra - n - hexyl (dithiodimethylene)diphosphonothiolothionate
Tetrakis(2 - isopropoxyethyl) (dithiodimethylene)bis(phosphonotrithioate)
Bis(4-chlorobenzyl) dicyclohexyl (dithiodimethylene)bis(phosphonodithiolate)
Tetradecyl triethyl (dithiodimethylene)diphosphonothionate
Tetraallyl (dithiodimethylene) di (phosphonodithiolate)
Methyl tribut - 2 - enyl (dithiodimethylene)diphosphonothionate
Tetrapropargyl (dithiodimethylene) di (phosphonodithiolate)
Tetrakis(4 - tert - amylphenyl) (dithiodimethylene) di (phosphonotrithioate)

The present bis(dithiodimethylene)diphosphonates or the above-mentioned sulfur analogues thereof are stable compounds which range from viscous liquids to waxy or crystalline solids. They are particularly valuable as biological toxicants, for example, as insecticides, fungicides and nematocides. They are most advantageously employed as agricultural insecticides, being particularly toxic to leaf-feeding insects when applied as a spray. While many of the present compounds possess a systemic effect when used against plant insects, others have little if any systemic action. Generally the present condensates are not phytotoxic at the concentrations at which they possess insecticidal effect.

In preparing the present esters I prefer to operate substantially as follows: the tri-ester or the alkali metal diester of phosphorous acid or of a sulfur analogue thereof is contacted with the bis(halomethyl) disulfide at ordinary, decreased, or moderately elevated temperatures until formation of the phosphono ester has occurred. In many instances, the condensation reaction is exothermic; hence except with the rather sluggish, high-molecular weight phosphites, external cooling may be required in order to effect smooth reaction. Generally, the bis(halomethyl) disulfide is mixed with the trivalent phosphorus ester at ordinary or decreased temperatures and then, in order to complete the reaction within a shortened period, heat is applied. Temperatures of from, say, 40° C. to 140° C., depending upon the nature of the individual reactants and product, may thus be employed. Instead of employing external cooling, the initial rather vigorous reaction may also be moderated by operating under partial pressure. When working with the triesters of the phosphorus acids, there is evolved as by-product an organic halide which corresponds to the alcohol portion of the ester. It is advantageous to arrange for removal of this halide as it is formed. This may be done by providing the reaction vessel with a Dry-Ice trap or condenser. If the trivalent phosphorus ester is an alkali metal diester rather than the triester, it is often advantageous to work in the presence of an inert diluent or solvent which conveniently may be the diluent originally employed in preparing the alkali metal phosphorus-containing reactant. For example, when preparing the condensate of, say, bis(chloromethyl) disulfide and sodium di-tert-butyl phosphite, the alkali metal diester may first be prepared by reacting di-tert-butyl phosphite with sodium in a diluent such as benzene, hexane or ethyl ether, and the mixture of sodium di-tert-butyl phosphite and diluent thus obtained may be used directly in the condensation reaction by simply mixing it with the bis(chloromethyl) disulfide. The condensation reaction may also be effected at increased pressure or in the presence of a catalyst; however, the ease of reaction at ordinary atmospheric pressure and in the absence of catalysts generally requires no hastening of the reaction by pressure variation or acceleration thereof by catalytic means.

The invention is further illustrated, but not limited, by the following examples:

*Example 1*

Bis(chloromethyl) disulfide (29.5 g., 0.18 mole) was placed in a 500 ml. 3-neck flask equipped with a glass stirrer, a dropping funnel, a thermometer and a condenser connected to a Dry Ice trap. There was then added dropwise 90 g., (0.54 mole) of triethyl phosphite during 30 minutes, while cooling the flask to maintain the temperature below 50° C. Some colorless liquid collected in the trap. Heat was then applied at 150–166° C. for thirty minutes. At the end of that time the weight of the ethyl chloride, B. P. 13–14° C., which had collected in the trap, was 16.5 g. The reaction mixture was transferred from the 3-neck flask to a Claisen vessel and distilled to remove material (35.6 g.) boiling up to 97° C./0.3 mm. (pot temperature 153° C.) and there was thus obtained as residue 42.4 g. (64% theoretical yield) of the substantially pure tetraethyl (dithiodimethylene)-diphosphonate, $n_D^{25}$ 1.4842, and analyzing 16.26% phosphorus, as against 16.9 P, the calculated value for the diphosphonate.

*Example 2*

A 500 ml. 4-neck flask equipped with stirrer, thermometer, dropping funnel and condenser connected to a Dry Ice trap was swept for 30 minutes with a nitrogen stream. Bis(chloromethyl) disulfide, (32.6 g., 0.2 mole) was placed in the flask, the flask was immersed in an ice bath, and freshly distilled triethyl phosphite (66.4 g., 0.4 mole) was then added during 20 minutes while maintaining the temperature of the mixture at 12–15° C. Throughout the addition of the phosphite an exothermic reaction was apparent. A water pump vacuum was applied to the reaction vessel and the mixture was refluxed (65° C./12 mm.) for 12 minutes and then heated at 130–136° C./75 mm. for another 12 minutes. Distillation of the resulting reaction mixture to remove material boiling below 96° C./0.2 mm. (pot temperature 142° C.) gave as residue 43.3 g. of the substantially pure tetraethyl (dithiodimethylene)diphosphonate analyzing as follows:

|  | Found | Calcd. for $C_{10}H_{24}O_6P_2S_2$ |
|---|---|---|
| Percent C | 33.28 | 32.8 |
| Percent H | 6.80 | 6.6 |
| Percent S | 16.73 | 17.5 |
| Percent P | 16.19 | 16.9 |

*Example 3*

This example describes the preparation of tetraethyl (dithiodimethylene)diphosphonate from sodium diethyl phosphite rather than from triethyl phosphite as in Examples 1 and 2.

The sodium diethyl phosphite was prepared as follows: Into a 1-liter, 4-neck flask equipped with stirrer, thermometer, condenser and dropping funnel there was placed 150 ml. of benzene, the flask was swept with nitrogen and there were then added 6 g. of sodium and 34.5 g. (0.25 mole) of freshly distilled diethyl phosphite. The whole was then refluxed for 2 hours.

At the end of this time a small piece of unreacted sodium was removed and a total of 16.3 g. (0.10 mole) of bis(chloromethyl) disulfide was introduced into the reaction mixture during twenty minutes while maintaining the temperature of the reaction mixture at 21–32° C. by cooling. When all of the disulfide had been added the reaction mixture was heated to 60° C. within twelve minutes and then maintained at a temperature of 60–67° C. for one hour. At this point about 0.2 g. of sodium iodide was added and the resulting reaction mixture was refluxed for 1.5 hours. The mixture remained almost colorless and somewhat cloudy, probably due to the finely suspended sodium chloride. About 75 ml. of hexane was added to help precipitate any unreacted sodium diethyl phosphite and the whole allowed to stand overnight at room temperature. After filtering there was obtained a somewhat cloudy filtrate which was clarified by means of a filter aid. Two-thirds (114.5 g.) of the filtrate was concentrated to a pot temperature of 99° C. at 0.2 mm. to give 13.7 g. (56% yield) of the substantially pure tetraethyl (dithiodimethylene)diphosphonate, $n_D^{25}$ 1.4929, the remaining one-third (57.25 g.) of the filtrate was mixed with the gelatinous precipitate obtained in the filtration and the whole was washed twice with water and allowed to stratify. Concentration of the organic layer to a pot temperature of 111° C./0.3 mm. gave 6.8 g. of the less pure tetraethyl (dithiodimethylene)diphosphonate, $n_D^{25}$ 1.5110.

*Example 4*

Trimethyl phosphite (74.3 g., 0.6 mole) was added during 45 minutes to 32.6 g. (0.2 mole) of bis(chloromethyl) disulfide at a temperature of from 5 to 17° C., this temperature being maintained by ice cooling. The resulting mixture was then heated at a temperature of 90–99° C. for 30 minutes. Distillation of the heated mixture to remove material boiling up to a temperature of 102° C./3 mm. gave as residue 51.3 g. (83% yield) of the substantially pure tetramethyl (dithiodimethylene)diphosphonate.

*Example 5*

To 32.7 g. (0.264 mole) of trimethyl phosphite there was added, with Dry Ice cooling, 16.3 g. (0.1 mole) of bis(chloromethyl) disulfide within a 20 minute period. During the addition, the temperature of the reaction mixture was maintained at from minus 12° C. to minus 20° C. When all of the disulfide had been added, the temperature was allowed to rise to 22° C., with occasional cooling in order to keep the reaction under control. The whole was then heated to 92° C., and distilled from a Claisen flask to remove material boiling below 97° C./0.8 mm. There was thus obtained the substantially pure tetramethyl (dithiodimethylene)diphosphonate, $n_D^{25}$ 1.5058, and analyzing as follows:

|  | Found | Calcd. for $C_6H_{16}O_6P_2S_2$ |
|---|---|---|
| Percent C | 23.56 | 23.2 |
| Percent H | 5.24 | 5.2 |
| Percent S | 19.38 | 20.7 |
| Percent P | 20.00 | 20.0 |

*Example 6*

To 24.4 g. (0.15 mole) of bis(chloromethyl) disulfide there was gradually added, at a temperature of 8–15° C., 78 g. (0.375 mole) of triisopropyl phosphite. The resulting reaction mixture was heated for 30 minutes at 125–135° C. and then allowed to stand overnight. Concentration of the reaction mixture to a pot temperature of 140° C./0.2 mm., gave as residue 31.3 g. of the substantially pure tetraisopropyl (dithiodimethylene)diphosphonate, $n_D^{25}$ 1.4747 and analyzing as follows:

|  | Found | Calcd. for $C_{14}H_{32}O_6P_2S_2$ |
|---|---|---|
| Percent C | 39.78 | 39.8 |
| Percent H | 7.98 | 7.64 |
| Percent P | 14.09 | 14.7 |
| Percent S | 15.37 | 15.2 |

*Example 7*

Bis(chloromethyl)disulfide (16.3 g., 0.10 mole) was placed in a 500 ml., 3-neck flask equipped with stirrer, thermometer, dropping funnel and a condenser connected to a vacuum pump. Freshly distilled tributyl phosphite (62.5 g., 0.25 mole) was then added to the flask during 30 minutes at a temperature of 10–15° C. and a pressure of 15–20 mm. of mercury. The mixture was then heated at a temperature of 120–140° C. for 30 minutes. Distillation of the resulting reaction mixture to remove material boiling below 116° C./0.3 mm. (pot temperature 154° C.) gave as residue 40.1 g. (84% theoretical yield) of the substantially pure tetrabutyl (dithiodimethylene)diphosphonate, $n_D^{25}$ 1.4725.

*Example 8*

Tris(2-ethylhexyl) phosphite (83.8 g., 0.2 mole) was gradually added with cooling during 20 minutes to 16.3 g. (0.10 mole) of bis(chloromethyl) disulfide. During the addition the temperature of the reaction mixture was maintained at from 25–29° C. The resulting yellow solution was then heated at 145–154° C. for 15 minutes and allowed to stand overnight at room temperature. It was then distilled to remove material boiling below 31–35° C./0.2 mm. and there was thus obtained as residue 75.8 g. of the substantially pure tetrakis(2-ethylhexyl) (dithiodimethylene)diphosphonate, $n_D^{25}$ 1.4693.

*Example 9*

Tris(2-chloroethyl) phosphite (81.8 g., 0.30 mole) was added with cooling to 24.4 g. (0.15 mole) of bis(chloromethyl) disulfide. During the addition the temperature of the reaction mixture was maintained at 25-35° C. by external cooling. It was then heated to 150° C. within 30 minutes and maintained at 150-154° C. for an additional 15 minutes. During the heating period a water pump pressure of 17 mm. of vacuum was applied through a trap which was attached to the reaction vessel. Removal of material boiling below 155° C./0.4 mm. gave as residue 77.6 g. of the viscous, liquid tetrakis(2-chloroethyl) (dithiodimethylene)-diphosphonate, $n_D^{25}$ 1.5262, and analyzing 11.86% phosphorus and 11.54% sulfur as against 12.3% P and 12.7% S, the calculated values of the tetrakis(2-chloroethyl) ester.

*Example 10*

To 24.4 g. (0.15 mole) of bis(chloromethyl) disulfide cooled to 2° C. there was gradually added 24.9 g. (0.15 mole) of triethyl phosphite during a time of 20 minutes, the reaction temperature being maintained below 8° C. The resulting solution was warmed to 32° C. to effect condensation and then cooled to 3° C. To the cooled reaction mixture, comprising essentially a diethyl monophosphonate ester, there was then added 37.6 g. (0.15 mole) of tributyl phosphite during 20 minutes. The whole was then heated to 120° C. and allowed to stand overnight at room temperature. Concentration of the resulting mixture to a temperature of 106° C./0.3 mm. gave as residue 68.3 g. of the substantially pure dibutyl diethyl (dithiodimethylene)diphosphonate, $n_D^{25}$ 1.4730.

*Example 11*

Triethyl phosphite (24.9 g., 0.15 mole) was added during 20 minutes to 24.4 g. (0.15 mole) of bis(chloromethyl) disulfide while maintaining the temperature of the mixture at 4-8° C. The whole was then allowed to attain room temperature in order to effect reaction of the phosphite with the disulfide and then cooled to about 5° C. To the cooled mixture there was added 31.2 g. (0.15 mole) of triisopropyl phosphite during 12 minutes, the temperature of the reaction mixture being maintained at 5-10° C. during the addition. When addition of the triisopropyl ester was completed the mixture was heated to 120° C. and then concentrated to a pot temperature of 125° C./0.2 mm. There was thus obtained as residue the substantially pure diethyl diisopropyl (dithiodimethylene)diphosphonate, $n_D^{25}$ 1.4857, and analyzing as follows:

|   | Found | Calcd. for $C_{12}H_{28}O_6P_2S_2$ |
|---|---|---|
| Percent C | 35.50 | 36.5 |
| Percent H | 7.25 | 7.16 |
| Percent P | 14.47 | 15.7 |
| Percent S | 17.25 | 16.2 |

*Example 12*

This example describes the preparation of diethyl dimethyl (dithiodimethylene)diphosphonate. Freshly distilled trimethyl phosphite (24.8 g., 0.2 mole) was added during 20 minutes to 32.6 g. (0.2 mole) of bis(chloromethyl) disulfide while maintaining the temperature of the mixture at from minus 1° C. to minus 6° C. External cooling was then removed and the temperature allowed to increase to 20° C. in order to assure condensation of the phosphite with the disulfide. It was then cooled to about 9° C. and freshly distilled triethyl phosphite (41.5 g., 0.25 mole) was added during 20 minutes while maintaining the temperature at from 9-15° C. The resulting reaction mixture was then allowed to stand at room temperature for several days and distilled to a pot temperature of 139° C./1 mm. to give as residue 51.4 g. (76% theoretical yield) of the substantially pure diethyl dimethyl (dithiodimethylene)-diphosphonate, $n_D^{25}$ 1.4956 and analyzing as follows:

|   | Found | Calcd. for $C_8H_{20}O_6P_2S_2$ |
|---|---|---|
| Percent C | 29.91 | 28.4 |
| Percent H | 6.08 | 5.97 |
| Percent S | 17.60 | 18.9 |

*Example 13*

Tris(2-chloroethyl) phosphite (26.9 g., 0.1 mole) was gradually added to 16.3 g. (0.1 mole) of bis(chloromethyl) disulfide while maintaining the temperature of the mixture at from minus 4° C. to minus 8° C. by means of Dry Ice cooling. When all of the phosphite had been added, the reaction mixture was warmed to about 20° C. whereby an exothermic reaction occurred so that external cooling had to be applied in order to maintain the temperature below 30° C. When reaction had subsided the reaction mixture was maintained at 35-36° C. for 0.2 hour. It was then cooled and 18.2 g. (0.11 mole) of freshly distilled triethyl phosphite was added to the cooled mixture at a temperature of 2-5° C. After being allowed to stand overnight at room temperature the reaction mixture was concentrated in a Claisen flask to remove material boiling below a pot temperature of 147° C./mm., and there was thus obtained as residue 44.3 g. of the substantially pure bis(2-chloroethyl) diethyl (dithiodimethylene)diphosphonate, $n_D^{25}$ 1.5067.

*Example 14*

Bis(chloromethyl) disulfide (16.3 g., 0.1 mole) was placed in a flask equipped with thermometer, stirrer, condenser and Dry Ice trap. The flask was cooled in a Dry Ice bath and 26.9 g. (0.1 mole) of tris(2-chloroethyl) phosphite was added during 12 minutes while maintaining the temperature of the mixture at minus 4° C. to minus 8° C. The whole was then heated at 35-41° C. for 12 minutes, and cooled. To the cooled mixture there was added 13 g. (0.11 mole) of freshly fractionated trimethyl phosphite during a time of 12 minutes at a temperature of 12-15° C. When all of the methyl ester had been added the whole was heated to 35° C. and maintained at from 35-40° C. for 20 minutes. It was then allowed to stand overnight at room temperature. Removal of material boiling below 143° C./1 mm. gave as residue 42.3 g. of the substantially pure bis(2-chloroethyl) dimethyl (dithiodimethylene)diphosphonate $n_D^{25}$ 1.5172.

*Example 15*

Testing for insecticidal activity of the tetraethyl (dithiodimethylene)diphosphonate of Example 1 or of Example 3 was conducted as follows:

I. *Residue sprayed Petri dish test.*—The test chemical was dissolved in acetone to make 70.0 ml. of a 1% solution; and this was further diluted to make 50 ml. of 0.1% solution. Petri dishes were respectively sprayed in a Hoskins horizontal spray chamber by means of a modified Potter sprayer with 20 ml. of the respective solutions for 15 seconds at a pressure of 20 p. s. i. Two dishes were sprayed with each solution to provide duplicates. An additional period of 30 seconds was allowed for settling of the mist, and the open dishes were then held for 24 hours. At the end of this time, ten *Tribolium confusium* adults were placed in one set of the duplicate dishes and ten fourth instar large milkweed nymphs (*Oncopeltus fasciatus*) were placed in the other set of duplicate dishes. The dishes were then held uncovered at room temperature for 48 hours, at which time a 100% kill of both test insects at either the 1.0% or the 0.1% concentration of the tetraethyl ester of either Example 1 or Example 3 was noted.

II. *Plant spray test—residue.*—Emulsions of the chemical were prepared by adding a cyclohexanone solution of the test compound and an emulsifying agent to water to give respective emulsions containing concentrations of 0.4% and 0.2% of the test chemicals. In each case the emulsifier, employed in a quantity of 0.2% by weight based on the weight of the total emulsion, was a mixture of a higher alkyl-benzenesulfonate and a polyalkylene glycol known to the trade as "Emulsifier L." Potted bean plants and potted cabbage plants were respectively sprayed to run-off with the emulsions. Twenty-four hours after spraying bean beetle larvae were transferred to the foliage of each of the sprayed bean plants, and cabbage aphids were transferred to the foliage of the sprayed cabbage plants. The plants were then held 3 days for observation. At the end of that time inspection of the plants showed a 100% kill of both the bean beetle larvae and the cabbage aphids on plants which had been sprayed with either the 0.4% or the 0.2% emulsion.

III. *Infested plant contact spray test.*—Bean plants which had been infested with the 2-spotted spider mite were sprayed with either an 0.2% or 0.1% emulsion of the tetraethyl (dithiodimethylene)diphosphonate. The sprayed plants were held 7 days for observation of kill of mobile and resting forms, eggs, and residual effect on the population. At the end of that period, inspection of the sprayed plants showed a 100% kill of both the adults and eggs and a 100% residual toxicity at both the 0.2% or 0.1% concentrations of the ester. In order to ascertain the least effective concentration of the tetraethyl (dithiodimethylene) diphosphonate of Example 1, the 0.1% emulsion was further diluted with water to give emulsions containing the ester in concentrations of 0.003%, 0.0016%, 0.00078% and 0.00039%, respectively. Spraying of bean plants which had been infested with the 2-spotted spider mite and observation of the sprayed plants at the end of 7 days showed a 100% kill of adults at each of these concentrations.

IV. *Plant dipping test—residue.*—Aqueous dispersions of the tetraethyl (dithiodimethylene)diphosphonate of Example 3 were prepared by adding the ester and an emulsifying agent to water in concentrations of 1.0% of the ester and 0.2% of the emulsifier based on the weight of the total dispersion. The emulsifying agent used was the "Emulsifier L" described under "Test II" above. The 1.0% emulsion was then further diluted with water to give a 0.2% concentration of said tetraethyl ester. The foliage of potted bean plants was dipped into the 0.2% dispersion, any excess dispersion was drained off, and the plants allowed to stand for 24 hours. Twenty-four hours after dipping, bean beetle larvae were transferred to the plant foliage. Observation of the plants after 24 hours showed a 66% kill of the larvae.

V. *Infested plant contact dipping test.*—Foliage of potted bean plants which had been infested with the 2-spotted mite were dipped into the aqueous dispersions of the tetraethyl (dithiodimethylene)diphosphonate of Example 3. The aqueous dispersions were prepared as described under Test IV above, except that a 0.1% dispersion of the ester was also prepared by diluting the 0.2 percent dispersion with water. The dipped plants were held 7 days for observation of kill of mobile and resting forms, eggs, and residual effect on the population. At the end of that period there was observed a 100% kill of both the adults and eggs and a 100% residual toxicity at both the 0.2% and the 0.1% concentration of the ester.

VI. *Systemic-test: Cut plants in solution.*—Black valentine bean plants in the second leaf stage were cut and placed in duplicate respective aqueous solutions of 10 and 100 p. p. m. of the tetraethyl (dithiodimethylene)diphosphonate ester of Example 1. They were held in the solution for 3 days, and then transferred to water. Mexican bean beetle larvae were transferred to each of one set of the duplicate test plants and 30 to 50 2-spotted mites to the other of the duplicate test plants. Observation at the end of 3 days showed a 100% kill of the beetle larvae and the mites at both the 100 p. p. m. and 10 p. p. m. concentrations.

*Example 16*

Insecticidal testing of the tetramethyl (dithiodimethylene)diphosphonate of Example 4 was conducted by the infested plant contact dipping test described as Test V in Example 15, except that here the tetramethyl, instead of the tetraethyl, ester was used, and the 1.0% dispersions of the methyl ester were diluted to give respective dispersions having the following concentrations of this ester: 0.2%, 0.1%, 0.05%, 0.025%, 0.0125%, 0.00625%, 0.00313%, 0.0016%, 0.0007% and 0.00039%. At each of these concentrations a 100% kill of 2-spotted mite adults was observed. Observation of the dipped plants at the end of three weeks showed a 100% residual activity for the 0.2% to 0.00625% concentrations, and 95%–99% residual activity for the 0.00313% concentration and fair activity for even the 0.00039% concentration. The limit of residual toxicity in the absence of reinfestation thus appears to be in the range of 0.00625% to 0.00313% concentration of the tetramethyl (dithiodimethylene)diphosphonate.

Systemic testing of the tetramethyl ester of Example 4 was also effected, employing the systemic test (VI) of Example 15 except that in the present instance a 20 p. p. m. concentration of the methyl ester was used. A 95%–99% kill of the mites and a 100% kill of the beetles was observed at the end of three days.

*Example 17*

Diethyl dibutyl (dithiodimethylene)diphosphonate was tested for insecticidal activity employing the infested plant contact dipping test described as Test V in Example 15. At a 0.2% concentration a 100% kill of adult mites and a 100% residual toxicity was observed at the end of one week.

Systemic testing of the diethyl dibutyl ester employing the cut plant procedure of Example 15 (Test VI), but using a 40 p. p. m. concentration of this ester showed 95%–99% kill of 2-spotted mites at the end of three days.

*Example 18*

Diethyl diisopropyl (dithiodimethylene)diphosphonate was tested for insecticidal activity by the dipping method of Example 15, Test V. At a 0.2% concentration a 100% kill of 2-spotted mite adults and a 100% residual toxicity was observed after 7 days. Systemic testing by the procedure of Test VI of Example 15 gave a 100% kill of mites at the end of 3 days for a 40 p. p. m. concentration of this mixed ester.

*Example 19*

Tetrakis(2 - chloroethyl) (dithiodimethylene)diphosphonate was tested for insecticidal activity employing plant dipping residue test (IV) of Example 15. At a 0.2% concentration of the chloroethyl ester, a 100% kill of the Mexican bean beetle larvae was observed after 24 hours.

Employing the infested plant contact dipping test (V) of Example 15, a 100% kill of both the 2-spotted mite adults and eggs was observed at the end of seven days at a 0.2% concentration of the tetrakis(2-chloroethyl) (dithiodimethylene)diphosphonate.

When this chloroethyl ester was tested by the infested plant contact spray test (III) of Example 15, a 100% kill of 2-spotted mite adults was observed at the end of seven days at concentrations of 0.2%, 0.1% and 0.05% of the ester.

*Example 20*

The tetraethyl (dithiodimethylene)diphosphonate of Example 1 was tested against nematodes by employing the following procedure:

The tetraethyl ester of Example 1 was introduced into an aqueous culture with the nematodes *Panagrellus redivivus* in an amount calculated to be in a concentration of 0.1% by weight of said aqueous culture. It is known that a nematode when placed in water flexes its body at a more or less constant rate and that the effect of a nematocide can be estimated reasonably accurately by counting the rate of this flexing action. This motility of the nematode is observed through a microscope and the number of flexures is counted, the effect on the nematode being expressed as a percentage of the normal flexing rate of a control dispersion not containing a nematocidal agent. At the end of 24 hours the flexing rate of the nematodes in the culture which contained the 0.1% concentration of the tetraethyl (dithiodimethylene)diphosphonate was only 5% of that of the nematodes in the control dispersion.

Other condensates of a trivalent phosphorus ester and bis(chloromethyl) disulfides which may be used as insecticides include condensates of said disulfide and sodium diamyl phosphorothioate, tri-n-butyl phosphorodithioate, or potassium dimethyl phosphorotrithioate, etc.

The present condensates are generally applied for pesticidal use in the form of sprays or aerosols. The spray may be prepared by dissolving the condensates in the usual organic solvents, e. g., acetone, hexane, benzene or carbon tetrachloride; but it is preferred to prepare the sprays by incorporating the present phosphono compounds into aqueous emulsions because less of the active ingredients, i. e., the phosphono esters, is thus required to give comparable insecticidal efficiency. The emulsions are easily made by first preparing a solution in water to form an emulsion. Because of the very high insecticidal efficiency of the present esters, they are present in the insecticidal emulsion in only very small concentrations, for example, in concentrations of, say, from 0.001% to 1.0% by weight of the total emulsion. Emulsifying agents which may be employed are those customarily used in the art for the preparation of oil-in-water emulsions, e. g., long-chained polyalkylene glycols, long-chained sulfosuccinates, etc.

The present esters may also be dissolved in liquefied gases such as the fluorochloroethanes or methyl chloride and applied from aerosol bombs containing the solution.

Instead of employing liquids as carriers and diluents, pesticidal dusts comprising the present esters may be prepared. Solid carriers useful for such purpose include talc, clay, bentonite, pumice, fuller's earth, etc.

What I claim is:

1. An organic compound having the formula

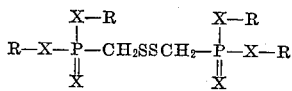

in which R is selected from the class consisting of alkyl and chloroalkyl radicals of from 1 to 8 carbon atoms, and X is selected from the class consisting of oxygen and sulfur.

2. An organic phosphorus compound of the formula

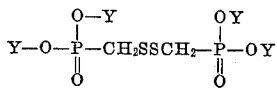

in which Y is an alkyl radical of from 1 to 8 carbon atoms.

3. Tetraethyl (dithiodimethylene)diphosphonate.
4. Tetramethyl (dithiodimethylene)diphosphonate.
5. Diethyl dibutyl (dithiodimethylene)diphosphonate.
6. Diethyl diisopropyl (dithiodimethylene)diphosphonate.
7. Tetrakis(2-chloroethyl) (dithiodimethylene)diphosphonate.

8. The method which comprises condensing a bis(halomethyl) disulfide with an ester of the formula

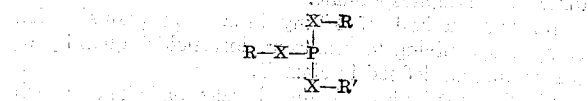

in which R is selected from the class consisting of alkyl and chloroalkyl radicals of from 1 to 8 carbon atoms, X is selected from the class consisting of oxygen and sulfur and R' is selected from the class consisting of R and an alkali metal, and recovering from the resulting reaction product a phosphono compound having the formula

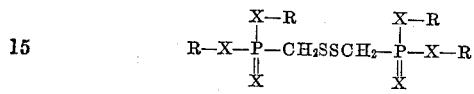

in which R is selected from the class consisting of alkyl and chloroalkyl radicals of from 1 to 8 carbon atoms, and X is selected from the class consisting of oxygen and sulfur.

9. The method which comprises condensing bis(chloromethyl) disulfide with an ester of the formula P(OY)₃ in which Y is an alkyl radical of from 1 to 8 carbon atoms and recovering from the resulting reaction product a (dithiodimethylene)diphosphonate of the formula

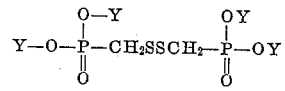

in which Y is an alkyl radical of from 1 to 8 carbon atoms.

10. The method which comprises condensing bis(chloromethyl) disulfide with an alkali metal dialkyl phosphite having from 1 to 8 carbon atoms in the alkyl radical and recovering from the resulting reaction product of tetraalkyl (dithiodimethylene)diphosphonate having from 1 to 8 carbon atoms in the alkyl radical.

11. The method which comprises condensing bis(chloromethyl) disulfide with triethyl phosphite and recovering tetraethyl (dithiodimethylene)diphosphonate from the resulting reaction product.

12. The method which comprises condensing bis(chloromethyl) disulfide with trimethyl phosphite and recovering tetramethyl (dithiodimethylene)diphosphonate from the resulting reaction product.

13. A biological toxicant comprising an inert carrier and as the essential active ingredient an organic phosphorus compound of the formula

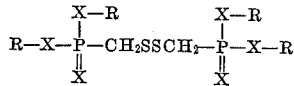

in which R is selected from the class consisting of alkyl and chloroalkyl radicals of from 1 to 8 carbon atoms, and X is selected from the class consisting of oxygen and sulfur.

14. An insecticidal composition comprising an oil-in-water emulsion of a toxic quantity of an organic phosphorus compound of the formula

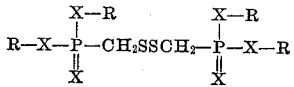

in which R is selected from the class consisting of alkyl and chloroalkyl radicals of from 1 to 8 carbon atoms, and X is selected from the class consisting of oxygen and sulfur.

15. An insecticidal composition comprising an oil-in-water emulsion of a toxic quantity of a tetraalkyl (dithiodimethylene)diphosphonate having from 1 to 8 carbon atoms in the alkyl radical.

16. An insecticidal composition comprising an oil-in-water emulsion of a toxic quantity of tetraethyl (dithiodimethylene)diphosphonate.

17. An insecticidal composition comprising an oil-in-water emulsion of a toxic quantity of tetramethyl (dithiodimethylene) diphosphonate.

18. The method of killing insects on plants which comprises applying to plants an insecticidal quantity of the compound defined in claim 1.

19. The method of killing insects on plants which comprises applying to plants an insecticidal quantity of tetramethyl (dithiodimethylene) diphosphonate.

References Cited in the file of this patent

UNITED STATES PATENTS 2,634,288    Boyer et al.    Apr. 7, 1953

FOREIGN PATENTS 660,918    Great Britain    Nov. 14, 1951

UNITED STATES PATENT OFFICE
CERTIFICATE OF CORRECTION

Patent No. 2,857,304                 October 21, 1958

Gail H. Birum

It is hereby certified that error appears in the printed specification of the above numbered patent requiring correction and that the said Letters Patent should read as corrected below.

Column 10, line 26, for "C./mm." read -- C./1 mm. --.

Signed and sealed this 6th day of September 1960.

(SEAL)
Attest:
ERNEST W. SWIDER
Attesting Officer

ROBERT C. WATSON
Commissioner of Patents